(12) United States Patent
Smith

(10) Patent No.: US 6,898,657 B2
(45) Date of Patent: May 24, 2005

(54) AUTONOMOUS SIGNAL PROCESSING RESOURCE FOR SELECTIVE SERIES PROCESSING OF DATA IN TRANSIT ON COMMUNICATIONS PATHS IN MULTI-PROCESSOR ARRANGEMENTS

(75) Inventor: Winthrop W. Smith, Richardson, TX (US)

(73) Assignee: Tera Force Technology Corp., Richardson, TX (US)

( * ) Notice: Subject to any disclaimer, the term of this patent is extended or adjusted under 35 U.S.C. 154(b) by 172 days.

(21) Appl. No.: 10/320,078

(22) Filed: Dec. 16, 2002

(65) Prior Publication Data

US 2004/0117519 A1 Jun. 17, 2004

Related U.S. Application Data

(60) Division of application No. 10/198,021, filed on Jul. 18, 2002, which is a continuation-in-part of application No. 09/850,939, filed on May 8, 2001, now Pat. No. 6,757,761.

(51) Int. Cl.$^7$ .............................................. G06F 13/14
(52) U.S. Cl. ........................... 710/305; 710/22; 710/23; 710/24; 710/25; 710/26; 710/27; 710/28; 712/11; 712/12; 712/33; 712/34; 712/35
(58) Field of Search .............................. 710/22, 23, 24, 710/25, 26, 27, 28, 305; 712/11, 12, 33, 34, 35

(56) References Cited

U.S. PATENT DOCUMENTS

| | | | |
|---|---|---|---|
| 5,197,130 A | * | 3/1993 | Chen et al. ...................... 712/3 |
| 5,784,630 A | * | 7/1998 | Saito et al. ..................... 712/30 |
| 6,167,502 A | * | 12/2000 | Pechanek et al. ............. 712/15 |

* cited by examiner

Primary Examiner—Jeffrey Gaffin
Assistant Examiner—Alan S. Chen
(74) Attorney, Agent, or Firm—Robert H. Frantz

(57) ABSTRACT

A multi-processor arrangement having an interprocessor communication path between each of every possible pair of processors, in addition to I/O paths to and from the arrangement, having signal processing functions configurably embedded in series with the communication paths and/or the I/O paths. Each processor is provided with a local memory which can be accessed by the local processor as well as by the other processors via the communications paths. This allows for efficient data movement from one processor's local memory to another processor's local memory, such as commonly done during signal processing corner turning operations. Configurable signal processing logic may be configured to host one or more signal processing functions which allow data to be autonomously accessed from the processor local memories, processed, and re-deposited in a local memory.

5 Claims, 8 Drawing Sheets

US 6,898,657 B2

AUTONOMOUS SIGNAL PROCESSING RESOURCE FOR SELECTIVE SERIES PROCESSING OF DATA IN TRANSIT ON COMMUNICATIONS PATHS IN MULTI-PROCESSOR ARRANGEMENTS

CROSS-REFERENCE TO RELATED APPLICATIONS

Claiming Benefit Under 35 U.S.C. 120

This application is a division of U.S. patent application Ser. No. 10/198,021, filed on Jul. 18, 2002, which is currently pending and is a continuation-in-part of U.S. Patent application Ser. No. 09/850,939, filed on May 8, 2001, which is now U.S. Pat. No. 6,757,761 currently allowed and awaiting issuance, both of which share a common inventor, Winthrop W. Smith, with the instant application.

FEDERALLY SPONSORED RESEARCH AND DEVELOPMENT STATEMENT

This invention was not developed in conjunction with any Federally sponsored contract.

MICROFICHE APPENDIX

Not applicable.

INCORPORATION BY REFERENCE

The related U.S. patent applications, Ser. No. 09/850,939, filed on May 8, 2001, and U.S. patent application Ser. No. 10/198,021, filed on Jul. 18, 2002, filed by Winthrop W. Smith, are hereby incorporated by reference in their entireties, including drawings.

BACKGROUND OF THE INVENTION

1. Field of the Invention

This invention relates to the arts of signal processing, multi-processor architectures, and programmable logic.

2. Description of the Related Art

This application is a divisional application of U.S. patent application Ser. No. 10/198,021, filed on Jul. 18, 2002, which is currently pending and is a continuation-in-part application of U.S. patent application Ser. No. 09/850,939, filed May 8, 2001, which is now U.S. Pat. No. 6,757,761 currently allowed and awaiting issuance.

There are many applications of image and signal processing which require more microprocessing bandwidth than is available in a single processor at any given time. As microprocessors are improved and their operating speeds increase, so too are the application demands continuing to meet or exceed the ability of a single processor. For example, there are certain size, weight and power requirements to be met by processor modules or cards which are deployed in military, medical and commercial end-use applications, such as a line replaceable unit ("LRU") for use in a signal processing system onboard a military aircraft. These requirements typically limit a module or card to a maximum number of microprocessors and support circuits which may be incorporated onto the module due to the power consumption and physical packaging dimensions of the available microprocessors and their support circuits (memories, power regulators, bus interfaces, etc.).

As such, a given module design or configuration with a given number of processors operating at a certain execution speed will determine the total bandwidth and processing capability of the module for parallel and distributed processing applications such as image or signal processing. Thus, as a matter of practicality, it is determined whether a particular application can be ported to a specific module based upon these parameters. Any applications which cannot be successfully be ported to the module, usually due to requiring a higher processing bandwidth level than available on the module, are implemented elsewhere such as on mini-super computers.

As processor execution rates are increased, microprocessing system component integration is improved, and memory densities are improved, each successive multi-processor module is redesigned to incorporate a similar number of improved processors and support circuits. So, for example, a doubling of a processor speed may lead to the doubling of the processing bandwidth available on a particular module. This typically allows twice as many "copies" or instances of applications to be run on the new module than were previously executable by the older, lower bandwidth module. Further, the increase in processing bandwidth may allow a single module to run applications which were previously too demanding to be handled by a single, lower bandwidth module.

The architectural challenges of maximizing processor utilization, communication and organization on a multi-processor module remains constant, even though processor and their associated circuits and devices tend to increase in capability dramatically from year to year.

For many years, this led the military to design specialized multi-processor modules which were optimized for a particular application or class of applications, such as radar signal processing, infrared sensor image processing, or communications signal decoding. A module designed for one class of applications, such as a radar signal processing module, may not be suitable for use in another application, such as signal decoding, due to architecture optimizations for the one application which are detrimental to other applications.

In recent years, the military has adopted an approach of specifying and purchasing computing modules and platforms which are more general purpose in nature and useful for a wider array of applications in order to reduce the number of unique units being purchased. Under this approach, known as "Commercial-Off-The-Shelf" ("COTS"), the military may specify certain software applications to be developed or ported to these common module designs, thereby reducing their lifecycle costs of ownership of the module.

This has given rise to a new market within the military hardware suppliers industry, causing competition to develop and offer improved generalized multi-processor architectures which are capable of hosting a wide range of software applications. In order to develop an effective general hardware architecture for a multi-processor board for multiple applications, one first examines the common needs or nature of the array of applications. Most of these types of applications work on two-dimensional data. For example, in one application, the source data may represent a 2-D radar image, and in another application, it may represent 2-D magnetic resonance imaging. Thus, it is common to break the data set into portions for processing by each microprocessor. Take an image which is represented by an array of data consisting of 128 rows and 128 columns of samples. When a feature recognition application is ported to a quad processor module, each processor may be first assigned to process 32 rows of data, and then to process 32 columns of data. In signal processing parlance this is known as "corner turning". Corner turning is a characteristic of many algorithms and applications, and therefore is a common issue to be addressed in the interprocessor communications and memory arrangements for multi-processor boards and modules.

One microprocessor which has found widespread acceptance in the COTS market is the Motorola PowerPC ™. Available modules may contain one, two, or even four PowerPC processors and support circuits. The four-processor modules, or "quad PowerPC" modules, are of particular interest to many military clients as they represent a maximum processing bandwidth capability in a single module.

Quad Power PC board or module architectures on the market generally include "shared memory", "distributed memory architecture" and "dual memory" architectures. These architectures, though, could be employed well with other types and models of processors, inheriting the strengths and weaknesses of each architecture somewhat independently of the processor chosen for the module.

One advantage of distributed memory architecture modules is that input data received at a central crossbar can be "farmed out" via local crossbars to multiple processors nodes that perform the processing of the data in parallel and simultaneously. Quad PowerPC cards such as this are offered by companies such as CSP Inc., Mercury Computer Systems Inc., and Sky Computers Inc.

For example, during the first phase of processing a hypothetical two-dimensional (2-D) data set of 128 rows by 128 columns shown in TABLE 1 on a distributed memory quad processor card, a first set of 32 rows (rows 0–31) of data may be sent to a first processor node, a second set of 32 rows (rows 32–63) of data would be sent to a second processor node, a third set of 32 rows (rows 64 to 95) of data to the third processor node, and the fourth set of 32 rows (rows 96 to 127) of data to the fourth processor node. Then, in preparation for a second phase of processing data by columns, a corner turning operation is performed in which the first processor node would receive data for the first 32 columns, the second processor node would receive the data for the second 32 columns, and so forth.

TABLE 1

Example 128 × 128 Data Array

| Row | Column | | | | | | |
|---|---|---|---|---|---|---|---|
| | 0 | 1 | 2 | 3 | 4 | ... | 126 | 127 |
| 0 | 0xFE | 0x19 | 0x46 | 0x72 | 0x7A | ... | 0x9C | 0x4B |
| 1 | 0x91 | 0x22 | 0x4A | 0xA4 | 0xF2 | ... | 0xBE | 0xB3 |
| 2 | 0x9A | 0x9C | 0x9A | 0x98 | 0x97 | ... | 0x43 | 0x44 |
| 4 | 0x00 | 0x00 | 0x81 | 0x8F | 0x8F | ... | 0x23 | 0x44 |
| . | . | . | . | . | . | ... | . | . |
| . | . | . | . | . | . | ... | . | . |
| . | . | . | . | . | . | ... | . | . |
| 126 | 0x34 | 0x3A | 0x36 | 0x35 | 0x45 | ... | 0xFB | 0xFA |
| 127 | 0x75 | 0x87 | 0x99 | 0xF0 | 0xFE | ... | 0xFF | 0xFA |

Regardless of the type of bus used to interconnect the processor nodes, high speed parallel or serial, this architecture requires movement of significant data during a corner turning operation during which data that was initially needed for row processing by one processor node is transferred to another processor node for column processing. As such, the distributed memory architecture has a disadvantage with respect to efficiency of performing corner turning. Corner turning on multi-processor modules of this architecture type consumes processing bandwidth to move the data from one processor node to another, bandwidth which cannot be used for other computations such as processing the data to extract features or performing filtering algorithms.

Turning to the second architecture type commonly available in the COTS market, the advantage of shared memory architectures is that all data resides in one central memory. COTS modules having architectures such as this are commonly available from Thales Computers Corp., DNA Computing Solutions Inc., and Synergy Microsystems. In these types of systems, several processor nodes may operate on data stored in a global memory, such as via bridges between processor-specific buses to a standard bus (PowerPC bus to Peripheral Component Interconnect "PCI" bus in this example).

The bridges are responsible for arbitrating simultaneous attempts to access the global memory from the processor nodes. Additionally, common modules available today may provide expansion slots or daughterboard connectors such as PCI Mezzanine Connector (PMC) sites, which may also provide data access to the global memory. This architecture allows for "equal access" to the global data store, including the processor(s) which may be present on the expansion sites, and thus eases the decisions made during porting of large applications to specific processor nodes because each "job" to be ported runs equally well on any of the processor nodes.

Due to the centralized memory in this architecture, corner turning can be performed by addressing the shared memory with a pointer that increments by one when processing row data, and increments by the number of data samples in a row when processing column data. This avoids the need to ship or move data from one processor node to another following initial row-data processing, and thereby eliminates wasted processor cycles moving that data.

However, the disadvantage of this arrangement is that all processors must access data from the same shared memory, which often leads to a "memory bottleneck" that slows execution times due to some processor node requests being arbitrated, e.g. forced to wait, while another processor accesses the global memory. Thus, what was gained in eliminating the wasted processor cycles for moving data from node to node may be lost to wait states or polling loops caused by arbitration logic for accesses to shared memory.

Another multiprocessor architecture commonly found in modules available on the COTS market is the dual memory architecture, which is designed to utilize the best features of distributed and shared memory architectures, to facilitate fast processing and reduce corner turning overhead. Both memory schemes are adopted, providing the module with a global memory accessible by all processor nodes, and local memory for each processor or subset of processor nodes. This addresses the arbitration losses in accessing a single shared global memory by allowing processor node to move or copy data which is needed for intense accesses from global memory to local memory. Some data which is not so intensely needed by a processor is left in the global memory, which reduces the overhead costs associated with corner turning. D 4 Systems offers a module having an architecture such as this.

Most modern processors have increased their internal clock rate and computational capabilities per clock (or per cycle) faster than their ability to accept the data they need to process. In other words, most modern processors can now process data faster than they can read or write the data to be processed due to I/O speed limitations on busses and memory devices.

As a result, "operations/second" is no longer the chief concern when determining whether a particular processor or processor node is capable of executing a particular application. This concern has been replaced by data movement bandwidth as the driving consideration in measuring the performance of single processors, processor nodes and arrays of processors. TABLE 2 summarizes data movement capabilities of several currently available distributed architecture boards, including the Race++ ™ from Mercury Computer Systems Inc., the Sky Bolt II ™ from Sky Computers Inc., and the Myranet 2841 ™ from CSP Inc.

TABLE 2

Summary of Data Movement Capabilities for Available Multi-processor Modules

| Movement Endpoints | Race++ | SkyBolt II | Myranet |
|---|---|---|---|
| Processor to Local Mem | 1064 * 4 | 666 * 4 | 480 * 4 |
| Node to Node | 267 * 2 | 320 | 480 * 4 |
| Module I/O | 267 * 2 | 320 | 480 * 4 |

As can be seen from this comparison, each architecture has strong points and weak points. For example, the Race ++ ™ and SkyBolt II ™ architectures have nearly twice the performance for processor to local memory data movement than for node to node or module I/O data movement. For applications which utilize local memory heavily and do not need intense node-to-node movement or board I/O data flow, these may be adequate. But, this imbalance among data movement paths can eliminate these two boards from candidacy for many applications. On the contrary, the Myranet ™ board has a good balance between the data movement paths, but at the cost of efficient local memory accesses. For example, the Myranet ™ board appears to be approximately 50% faster transferring data in and out of the module and between nodes than the SkyBolt II ™, but 28% slower accessing local memory.

The related patent application established that there is a need in the art for a multiprocessor architecture for distributed and parallel processing of data which provides optimal data transfer performance between processors and their local memories, from processor to processor, and from processors to module inputs and outputs. In particular, there is a need in the art for this new arrangement to provide maximum performance when accessing local memory as well as nominal performance across other data transfer paths. Further, the related application established that there is a need in the art for this new architecture to be useful and advantageous for realization with any high speed microprocessor family or combination of microprocessor models, and especially those which are commonly used for control or signal processing applications and which exhibit I/O data transfer constraints relative to processing bandwidth. The invention described in the related patent application addressed these needs, and is summarized in the following paragraphs.

The invention of the related patent application utilized a programmable logic array in a key position between each microprocessor node and its memory, and provided functionality to allow each microprocessor in the multiprocessor array to access memory associated with another microprocessor in the array.

In order to maximize the capabilities of the related invention, it was desirable to extend the functionality of the multiprocessor array to utilize the programmable logic arrays to actually perform some level of processing, and especially signal processing, on the data stored in the processor memories and the data which flows through the logic array.

Programmable logic device suppliers such as Xilinx have promoted use of their devices to perform signal processing functions in hardware rather than using the traditional software or microprocessor-based firmware solutions. Thus, the combination of the location of the programmable logic in the topology of the invention disclosed in the related patent application and the availability of signal processing "macros" and designs for programmable logic produces an opportunity to embed signal processing in the new multiprocessor topology, thereby increasing the density of functionality and capability of the new architecture.

SUMMARY OF THE INVENTION

A quad-processor arrangement having six interprocessor communications paths, one direct communication path between each of the two possible pairs of processors, with signal processing functions embedded in the communications paths is disclosed. The embedded signal processing functions may also be utilized to process data as it is being moved into or out of the quad-processor arrangement.

Each processor is provided with a local memory which can be accessed by the local processor as well as by the other processors via the communications paths, either by direct reading and writing operations by the processors or preferably via automatic memory-to-memory transfers using direct memory access ("DMA") engines. This allows for efficient data movement from one processor's local memory to another processor's local memory, such as commonly done during signal processing corner turning operations.

The communications paths are controlled and interfaced to the processors through field programmable logic, which allows the board to be configured both statically and dynamically to optimize the data transfer characteristics of the module to match the requirements of the application software. In an additional advantage of the module architecture, the programmable logic may be configured so that the module emulates other existing board architectures in order to support legacy applications.

According to the present invention, the programmable logic is configured with an internal framework for hosting data processing functions, and especially digital signal processing, such that data traversing an interprocessor communication path or board bus can be processed in transit, whether the data is being moved from one local memory to another local memory using DMA, is being written or read by a DSP into a local memory, or is being moved into or out of the quad processor arrangement.

BRIEF DESCRIPTION OF THE DRAWINGS

The figures presented herein when taken in conjunction with the disclosure form a complete description of the invention.

DETAILED DESCRIPTION OF THE INVENTION

According to the preferred embodiment, the architecture of the invention is realized using four Motorola PowerPC ™ G4 processors in the data transfer path topology as disclosed in the related patent application. However, it will be recognized by those skilled in the art that the architecture and arrangement of the invention is equally applicable and advantageous for realization with any high speed microprocessor family or combination of microprocessor models, and especially those which are commonly used for control or signal processing applications and which exhibit I/O data transfer constraints relative to processing bandwidth. The field programmable logic of the preferred embodiment which is responsible for data path functions is extended to include a signal processing framework within the data path, which can be used as a signal processing resource in conjunction with or cooperation with the software capabilities of the microprocessors.

Therefore, the remainder of this disclosure is given in terms of implementation with the preferred microprocessor and the architecture of the related invention, but the data transfer paths disclosed herein may be equally well adopted between an arrangement of any set of processors.

Basic Communication Paths

Figure 1:
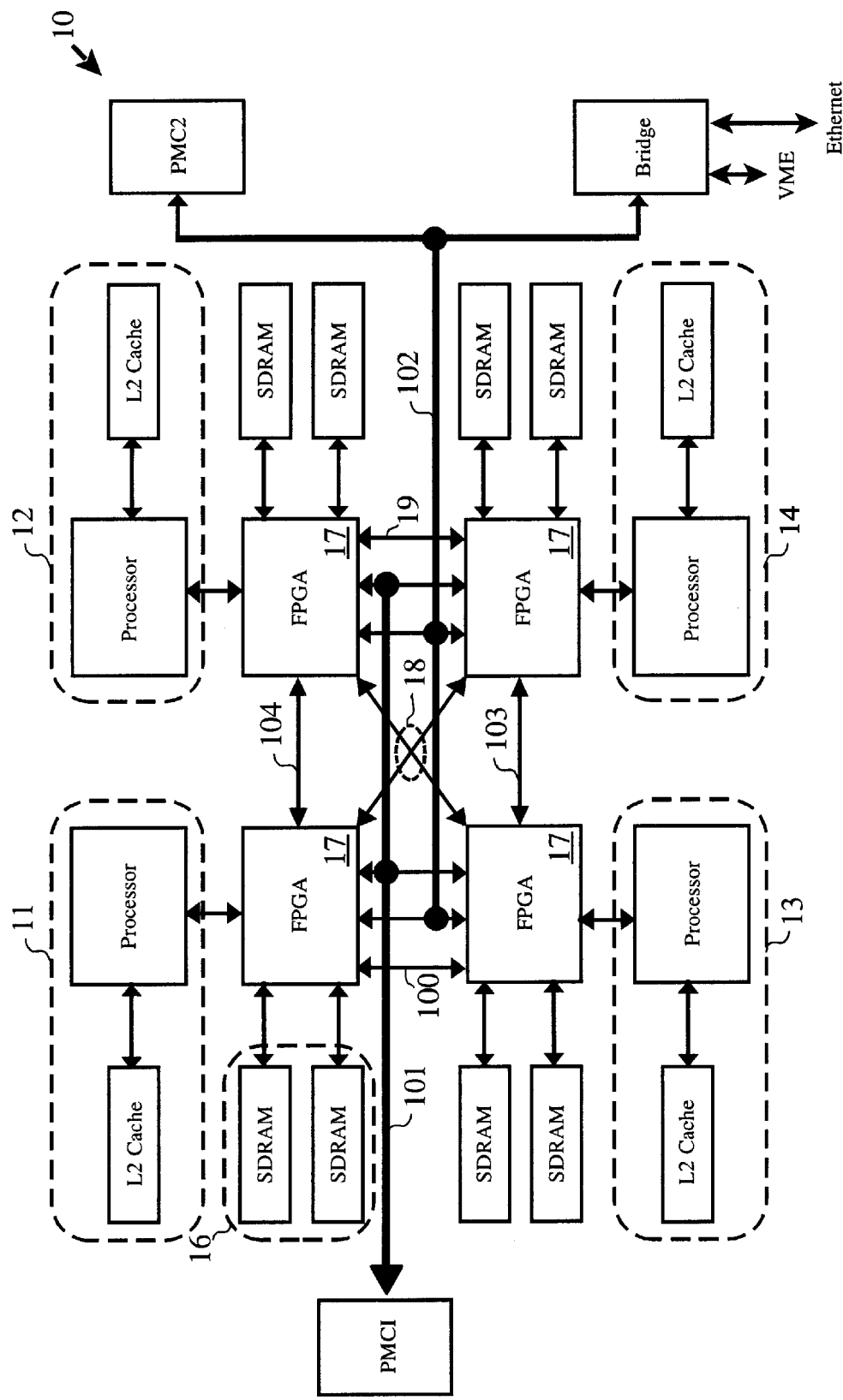
FIG. 1 illustrates the top-level view of the arrangement and architecture of the multiprocessor module according to the invention.

Turning to FIG. 1, the module architecture according to the preferred embodiment provides four processor nodes (11, 12, 13, 14), each node containing a member of the Motorola PowerPC ™ family microprocessors and associated support circuitry. Each of the processors is interfaced to an external level 2 (L2) cache memory, as well as a programmed field programmable gate array (FPGA) device (17).

The nodes (11, 12, 13, and 14) are interconnected to the programmed FPGA devices (17) such that interprocessor data transfer paths are established as follows:

(a) a "neighbor" path (102) between the first node (11) to the second node (12);

(b) a "neighbor" path (19) between the second node (12) to the fourth node (14);

(c) a "neighbor" path (103) between the fourth node (14) to the third node (13)

(d) a "neighbor" path (100) between the third node (13) to the first node (11);

(e) a "diagonal" path (18) between the first node (11) and the fourth node (14); and (f) a "diagonal" path (18) between the second node (12) and the third node (13).

In this new arrangement, every processor node is provided with a direct communication path to the other three processor nodes' local memory. According to the preferred embodiment, these paths are each 32-bit parallel bus, write-only paths. By defining the paths as write-only, arbitration circuitry and logic in the FPGA's is simplified and more efficient.

Software processes which require data from the memory of another processor node may "post" or write a request into the memory of the other processor, where a task may be waiting in the other processor to explicitly move the data for the requesting task. Alternate embodiments may allow each path to be read-only, or read-write, as well as having alternate data widths (e.g. 8, 16, 64, 128-bits, etc.).

The six interprocessor communication paths allow each processor in each node to have access to its own local memory. In an enhanced embodiment, each processor may also have "mapped into" its local memory space a portion of local memory of each of the other processors, as well. This allows the tasks in each processor to move only the data that needs to be moved, such as during corner turning, and to access data needed for processing from a local memory without arbitration for accesses to a global shared memory.

Also according to the preferred embodiment, board I/O communication paths (101 and 102) are provided between the FPGAs (17) and board I/O connectors, such as a VME bus connector, PMC expansion sites, and or an Ethernet daughterboard connector.

Configurability of Interprocessor Communication Path Interconnects

As the interprocessor or node-to-node communications path interconnects are implemented by buffering and control logic contained in the FPGA programs, and as the preferred embodiment utilizes a "hot programmable" FPGA such as the Xilinx XCV 1600-8-FG 1156™, the quad processor module can be reconfigured at two critical times:

(a) upon initialization and loading of the software into the processor nodes, such that the paths can be made, broken, and optimized for an initial task organization among the processors; and (b) during runtime on a real-time basis, such that paths may be dynamically created, broken or optimized to meet temporary demands of the processor module tasks and application.

This allows the module and architecture to be configured to "look like" any of the prior art architectures from the viewpoint of the software with respect to data flow topologies.

Local Memory Configuration

Each processor node (11, 12, 13, 14) is configured to have dual independent local memory banks (16), preferably comprised of 32 MB SDRAM each. A processor can access one of these banks at a given time, while the other bank is accessed by the module I/O paths (101) and (102). This allows another board or system to be loading the next set of data, perhaps from the board I/O bus, while each on-board processor works on the previous set of data, where the next set of data is stored in one bank and the previous set of data is stored in another bank. This eliminates arbitration and contention for accessing the same memory devices, thereby allowing the processor to access the assigned local memory bank with maximized efficiency. Alternate embodiments may include different depths, widths, or sizes of memory, and/or different memory types (e.g. FlashROM, ROM, DRAM, SRAM, etc.), of course.

Further according to the preferred embodiment, the programmed FPGAs (17) provide DMA engines that can automatically move data to and from the processors (11), using the board I/O communication paths (101, 102) and the interprocessor communications paths, without processor intervention. This allows processing and data movement to be performed in parallel, autonomously and simultaneously, without having to contend for access to each other's memories as in the shared memory and multi-port memory arrangements known in the art. Alternate, less complex embodiments of the function of the FPGA's may not include such DMA capabilities, and may be implemented in alternate forms such as processor firmware, application specific integrated circuits (ASICs), or other suitable logic.

According to the preferred embodiment, the addressing for the two memory banks is defined such that the four "upper" memory banks, one for each processor, form one contiguous memory space, while the four "lower" memory banks, again one for each processor, form a second contiguous but independent memory space. While this is not required to achieve the fundamental advantages of the invention, it provides for a further increase in the efficiency with which software processes may access the local and remote memories. Alternate implementations of this memory arrangement and addressing scheme can, of course, be made without departing from the spirit and scope of the invention, including usage of more than two memory banks per processor, organizing one or more banks of memory into"pages", etc.

Interprocessor Communications Path
Interconnections and Configurations

The communication paths between the processor nodes are defined by the programmed FPGA devices (17) in the preferred embodiment. Each FPGA device provides full 64-bit data and 32-bit address connections to the two memory banks local to it, in the preferred embodiment. The three paths from local processor to non-local memory (e.g. other processor nodes' local memories) are also 32-bits wide, and are write only, optimized for addressing the corner-turn processing function in two-dimensional signal processing. Alternate embodiments, of course, may use other types of logic such as ASICs or co-processors, and may employ various data and address bus widths.

Module I/O

In the preferred embodiment, the module provides two 64-bit, 66 MHz PCI-based board I/O communications interfaces (101 and 102), interfaced to the following items:
 (a) a first PCI bus (101) to PMC1 site, Race++ or P0 to all processor nodes; and
 (b) a second PCI bus (102) to PMC2 site to all processor nodes, preferably with a bridge to other bus types including VME and Ethernet.

As previously discussed regarding the preferred embodiment, the programmed FPGAs provide DMA engines for moving data in and out of the various local memories via the communications paths (100, 19, 103, 104) and the board I/O busses. In enhanced embodiments, direct reading and writing of data in the local memory by the processors may also be allowed. Alternate module I/O interfaces may be incorporated into the invention, including but not limited to alternate bus interfaces, expansion slot or connector interfaces, serial communications, etc.

Enhanced Module Functional Features

The multiple parallel interconnections between processor nodes allow the module to be configured to emulate various functions inherently advantageous to real-time processing, including:

(a) Ping-Pong Memory Processing, which is a technique commonly used for real-time applications to allow simultaneous, independent processing operations and data I/O operations.
 (b) "Free" corner turning, which is required by nearly all applications that start with a 2-D array of data. Typically, the processing of that 2-D array of data starts with processing along the rows of the array, followed by processing down the columns of the data array. To make efficient use of the power of the processors, the data to be first processed in the row dimension should all be located in the local memory of the processor(s) executing that work. Similarly, to make efficient use of the processors, the data to be subsequently processed in the column dimension should all be located in the local memory of the processor(s) performing subsequent or second phase of processing. In general, these are different sets of data and different processors. Therefore, rearranging the data (e.g. corner turning) must occur between the two phases of processing. The new module architecture of the invention allows output data from the first stage of processing to be automatically moved to the local memory of a second processor, where it is needed for the second phase of processing along columns. This technique avoids explicit movement of the data for corner turning entirely. Alternatively, by employing the FPGA DMA engines, this data or any other data in one processor's local memory can be moved to the local memory of another processor with no processor cycles wasted or used for the data movement. This latter approach may be useful in some applications where data is to be "broadcast" or copied to multiple destinations, as well. In either case, the data movement operation is a "free" operation on the module.
 (c) Multiple Architecture Configurations. There are two reasons it is useful to be able to configure the module's data paths to be organized like its lower performance counterparts. First, this allows applications to be easily moved from that counterpart board to the module first when configured similar to the counterpart. Later, the application software can be optimized for the higher performance capabilities of the module as a second, lower risk step. The second reason is that certain portions of an application may work better in one architecture than another. Dynamic reconfigurability of the module allows the application software to take advantage of that peculiarity of portions of the application to further optimize performance. As such, the module can be statically or dynamically configured through FPGA programs to resemble and perform like a pure distributed architecture, pure shared memory architecture, or hybrids of shared and distributed.

Signal Processing Functions Configurably
Embedded Communications Paths

Figure 2:
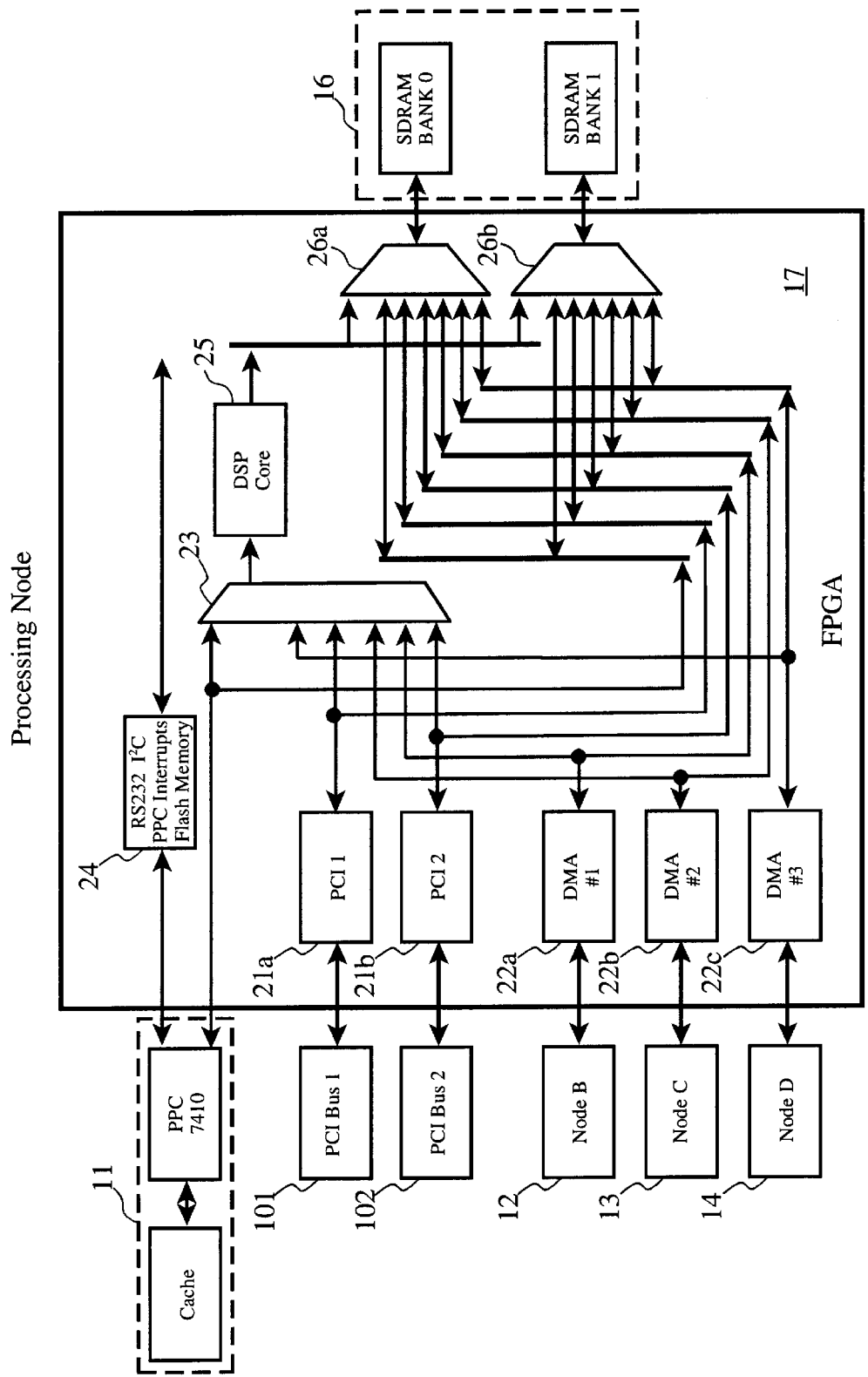
FIG. 2 provides additional detail of the internal architecture of the field programmable gate array for a processing node of the architecture as shown in FIG. 1.

According to the present invention, the FPGA (17) is enhanced to include the signal processing node (25) as shown in FIG. 2. The FPGA (17) is configured to have one or two PCI bus interfaces (21a, 21b), a direct memory access ("DMA") interface (22a, 22b, 22c) to each of the other processing nodes of the module, as well as internal bus selectors (26a, 26b) to the memory banks (16).

The DSP node (25) may receive data selectively (23) from either PCI interface (21a, 21b) from the PCI buses (101, 102) of the module, from the local processor (11), from any other processor node via DMA (22a, 22b, 22c), or from either of the local memories (16), as determined by DSP node data input selector (23).

In this arrangement, data may be received by the DSP node (25) from any of the other processor nodes, from local memory, or from source outside the quad processor arrangement (e.g. off-board sources), such that the data may be processed prior to storage and either of the memory banks (16).

With this addition of functionality to the FPGAs, our Matched Heterogeneous Array Topology Signal Processing System ("MHAT") is realized. One or more signal processing functions may be loaded into the DSP node (25) so as to allow data to be processed prior to storing in the memory banks (16). MHAT provides a marriage of the microprocessors and the FPGAs to facilitate simultaneous data processing and data reorganization, which reduces real-time operating system interrupt overhead processing and complexity.

Figure 3:
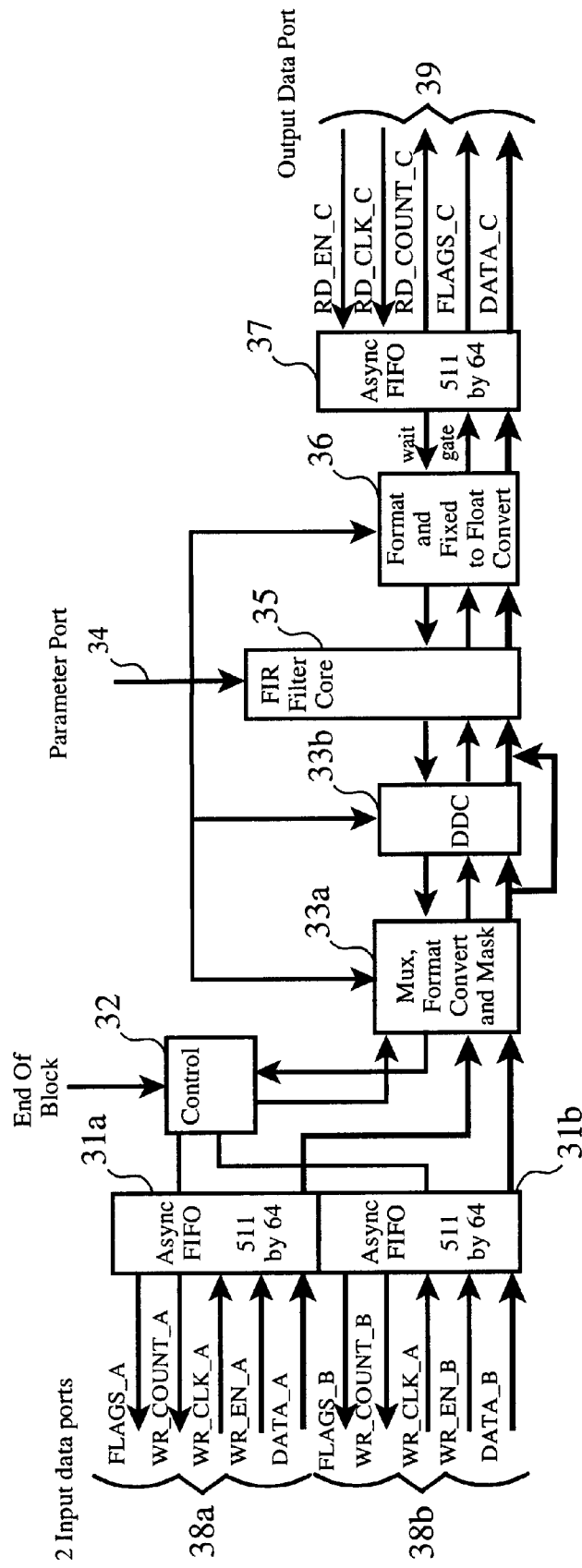
FIG. 3 shows the signal processing framework contained within the field programmable gate array of FIG. 2.

Turning to FIG. 3, the internal architecture of a DSP node (25) which provides a framework for hosting a variety of signal processing functions (35) is shown. The signal processing functions may include operations such as FIR filters, digital receivers, digital down converters, fast Fourier transforms ("FFT"), QR decomposition, time-delay beamforming, as well as other functions.

Two input data ports (38a, 38b) are provided, each of which receive data into an asynchronous first-in first-out ("FIFO") (31a, 31b). The data may then be multiplexed, formatted, and masked (33a), and optionally digitally down converted (33b) prior to being received into the signal processing logic (35).

After being processed by the signal processing logic (35), the data may again be formatted, converted from fixed point representation to floating point representation (36), and then it is loaded into an output asynchronous FIFO for eventual output to the output data port (39).

Figure 4:
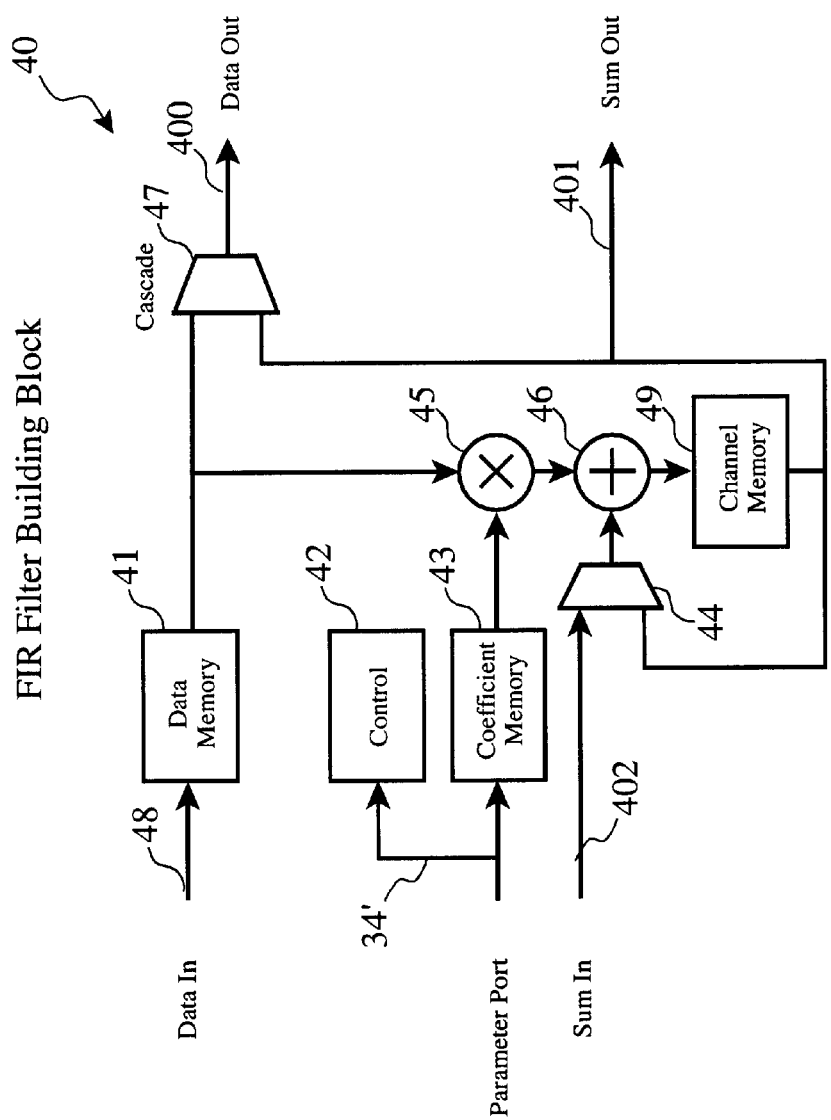
FIG. 4 illustrates a building block for a finite impulse response ("FIR") filter.

FIG. 4 provides more details of an FIR building block (40) which may be configured into the portion of the signal processing logic (35). Data which is received (48) from the previous building block or from the signal processing logic input formatters and digital down converters is received into the data memory (41). The data may then be multiplied (45) by coefficients stored in coefficient memory (43), summed (46) with previous summation results or (44) summation results from other building blocks (401, 402), the results of which operations is stored in channel memory (49).

The coefficient memory (43) may be loaded with coefficient values via the parameter port (34) to implement a filter having the desired properties. Control parameters (42) may also select (44) the source for summation (46) from channel memory (49) or a summation input (402).

Each summation result is presented at a summation output (401), as well selectively (47) at a block cascading data output (400) as determined by additional control parameters. Data which is received at the data input (48) can be selected (47) to flow through data memory (41) correctly to the data output (400), as well.

Figure 5:
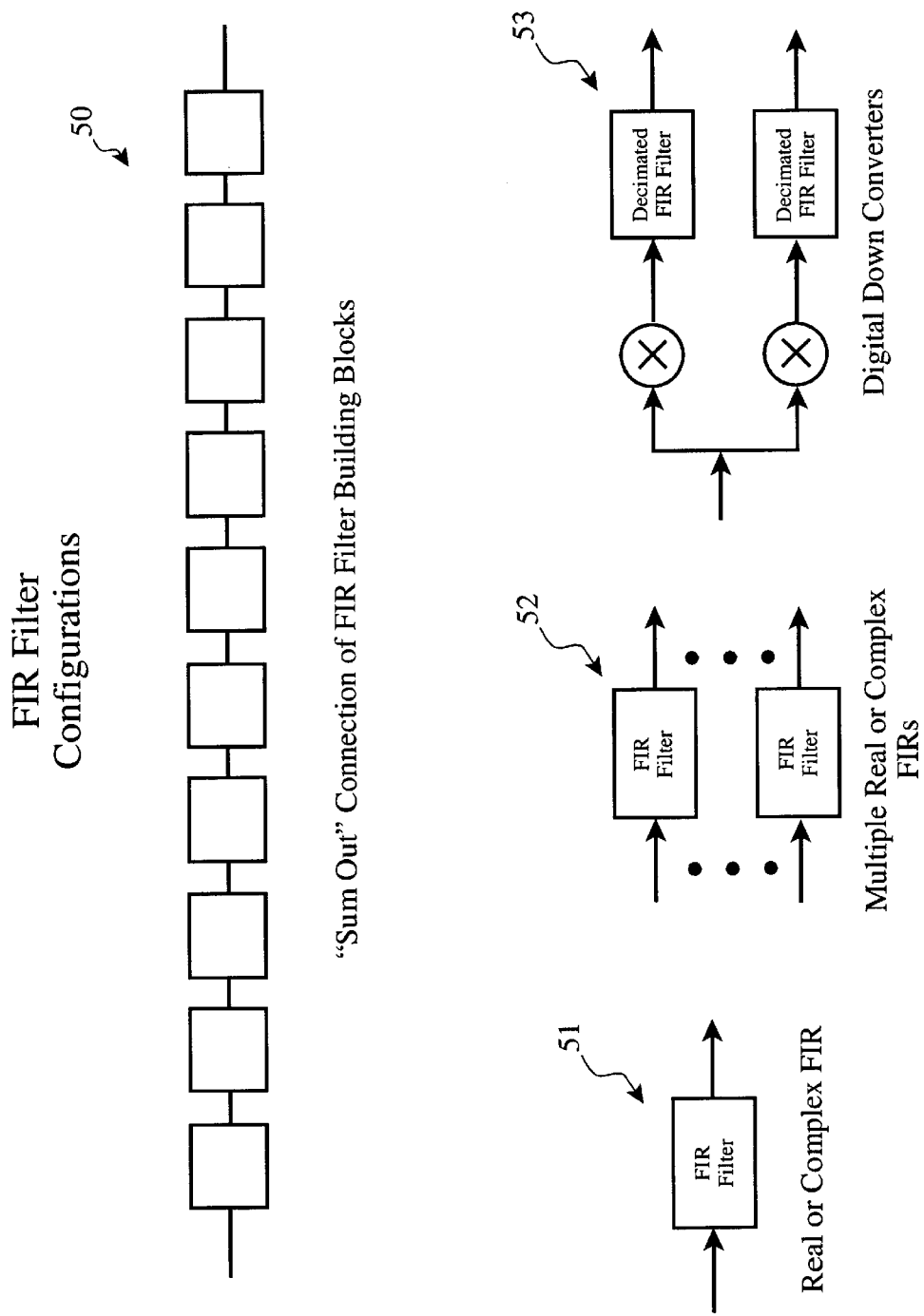
FIG. 5 illustrates general configuration possibilities for such FIR filters.

As such, multiple building blocks may be cascaded by interconnecting data inputs, data outputs, summation inputs, in summation outputs. Further, each building block may be customized and configured to have specific properties or characteristics as defined by the coefficients in control settings stored into the control memory (42) and coefficient memory (43), which is loadable by the microprocessor. In FIG. 5, a "sum out" connection arrangement (50) of such FIR filter building blocks is shown. This may include a single real or complex FIR filter (51), multiple filters (52), and digital down converters (53), as well as other functions. With this arrangement, a series of signal processing operations may be implemented which allows data to be processed in transit from one processing node's local memory to the local memory banks of another processor.

Figure 6:
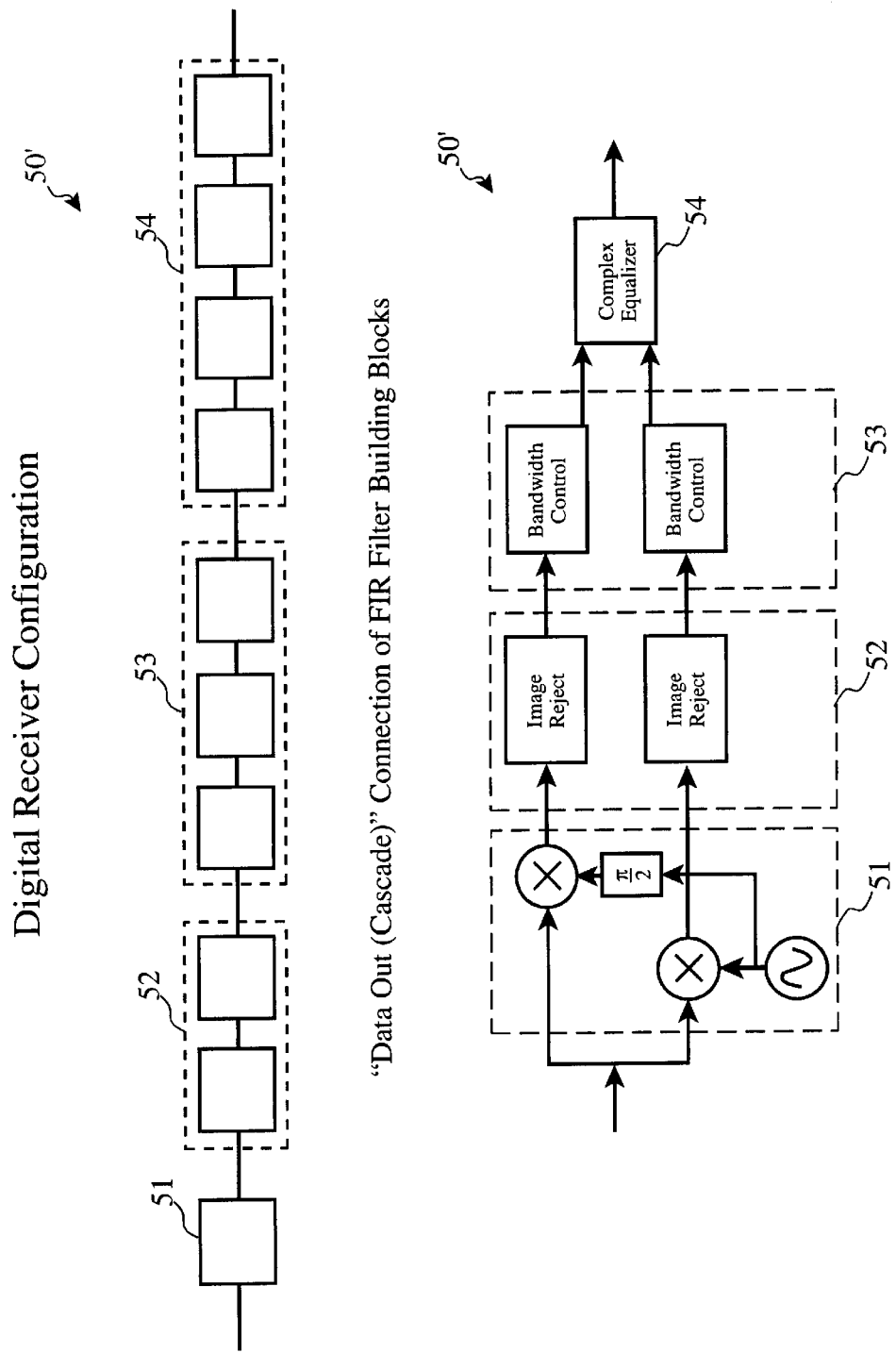
FIG. 6 provides an example of a digital receiver configuration according to the present invention.

In FIG. 6, a "data out" or cascade connection arrangement (50') of signal processing building blocks for a digital receiver is shown. In this example, a demodulator (51) is followed by image rejection (52) functions, which are in turn followed by bandwidth control functions (53), in which are followed by the complex equalizer (54).

Benchmark Performance Comparison

Figure 7:
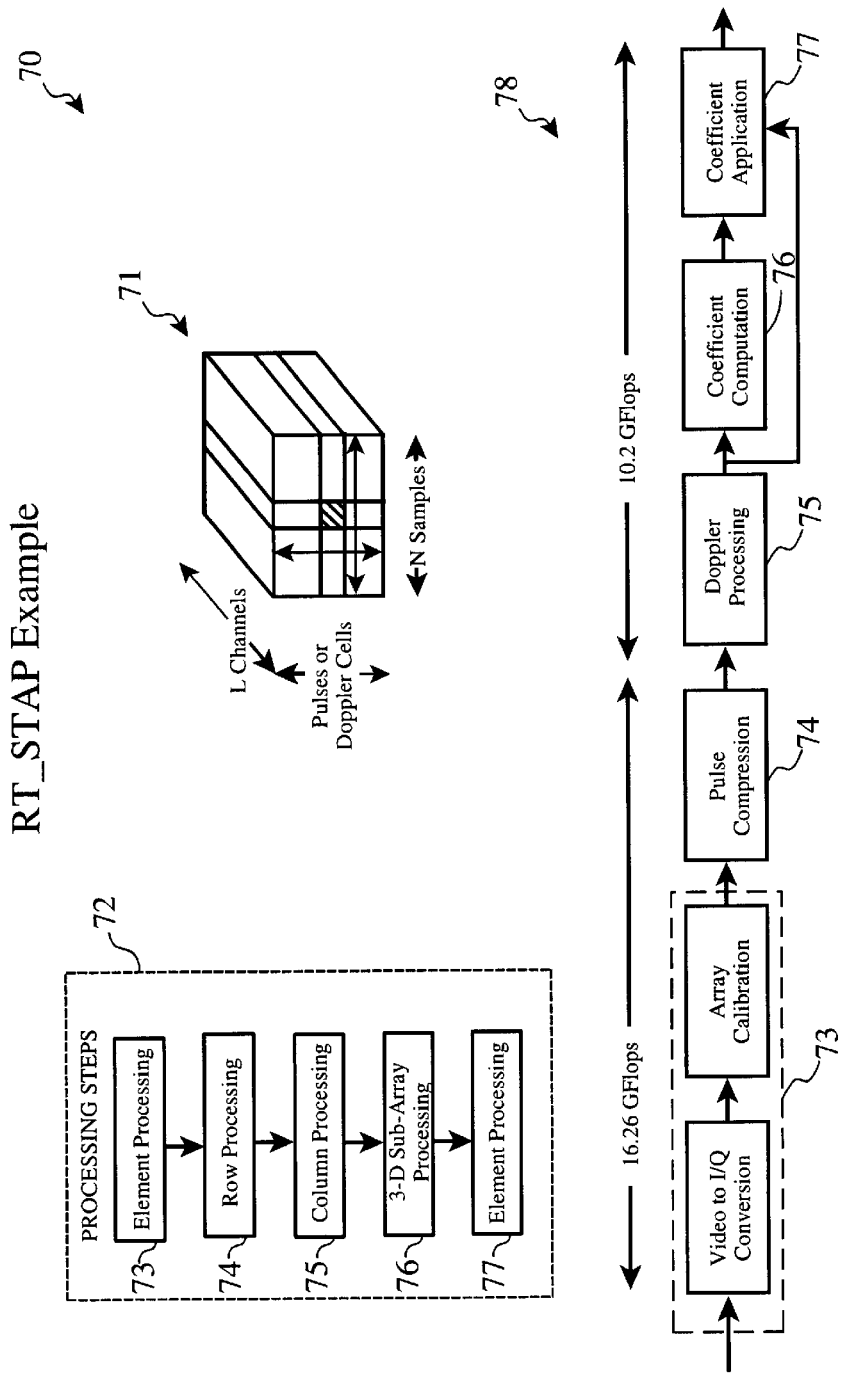
FIG. 7 provides details of a well known benchmark process used in the COTS industry to measure and gage the performance of processors and multiple processor complexes.

Turning to FIG. 7, the "RT_STAP" benchmark process used to measure the performance and functional density of COTS processing modules is shown. This particular process represents a task to find targets on a ground surface in a signal set acquired from an airborne platform such as an airplane. The benchmark process is designed to utilize various portions of processor modules (e.g. DMA, memory busses, interrupts, etc.), such that it represents a broad measurement of processing module's capabilities. It also includes a mix of types of processes, including simple sample-by-sample calculations in in-phase and quadrature ("I/Q") data (73), followed by pulse compression (74) correlation process, during which a corner turning process must be performed to transpose a matrix (71), followed by some Doppler processing (75), followed by a "QRD" function (76), which is an equations solver for performing adaptive processing. These processes are each well known in the art, and are commonly used within various mission profiles often performed by such multiprocessor modules.

As can be seen from this illustration, an particular implementation in software alone in an existing multiprocessor board may require 16.26 billion floating point operations per second (GigaFLOPS) to perform the initial processing (73, 74), and another 10.2 GigaFLOPS to perform the latter processing functions (75, 76, 77).

Figure 8:
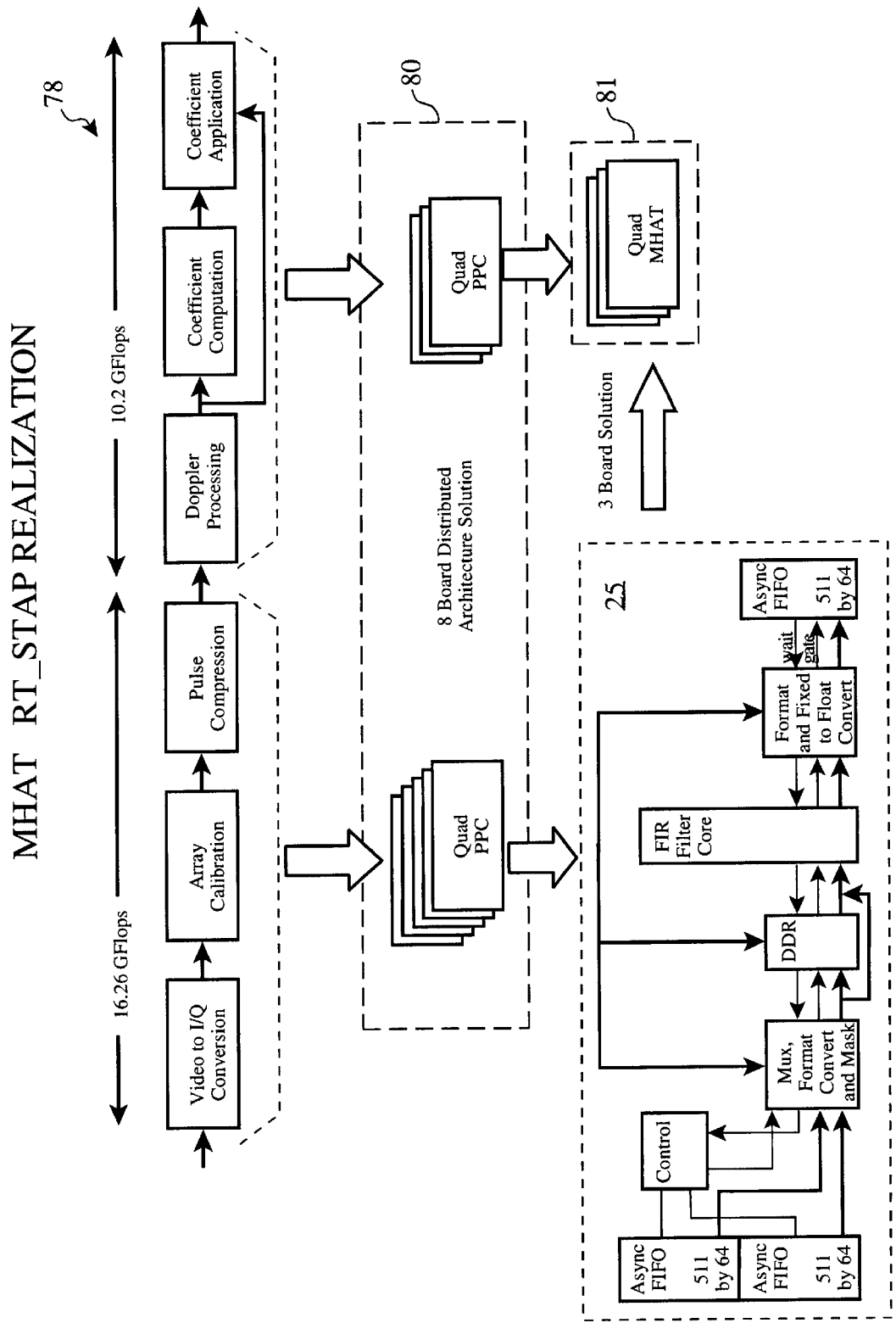
FIG. 8 discloses a graphical comparison between functions implemented on a multiprocessor module according to the related patent application compared to the density achieved when the present invention is realized with the multiprocessor module architecture.

This mission profile (78) may be met using 8 quad processor modules (80) of the type available on the market and previously described, five of which are dedicated to the initial processing functions, and three of which are dedicated to the latter processing functions, as shown in FIG. 8.

However, by enhancing the QuadPPC board to include the signal processing functionality embedded into the interprocessor communication paths according to the present invention, this entire mission profile may be realized using only 3 boards or modules (81). This results in decreased failure rates by required less physical hardware, decreased cost, and reduced system characteristics (e.g. weight, dimensions, power, etc.). For airborne platforms, reductions in system characteristics such as weight, size, and power translates to greater mission range, increased aircraft performance and maneuverability.

Conclusion

As will be recognized by those skilled in the art, many alternate embodiments using alternate busses, communication schemes, processors, and circuit implementations can be made without departing from the invention's architecture. Such alternate implementations may result in improved performance, costs and/or reliability, to suit alternate specific requirements. The preferred embodiment described herein, and compared by analysis to performance of existing designs, is suited for a particular purpose. It is within the skill of the art to adapt the preferred embodiment to meet alternate requirements without departing from the scope of the invention.

As certain details of the preferred embodiment have been described, and particular examples presented for illustration, it will be recognized by those skilled in the art that many substitutions and variations may be made from the disclosed embodiments and details without departing from the spirit and scope of the invention. For example, the general 6-path communications arrangement may be adopted with any of a number of microprocessors, and the logic of the FPGA's may be incorporated into the circuitry of the microprocessor. Therefore, the scope of the invention should be determined by the following claims.

What is claimed is:

1. An autonomous configurable signal processing resource in a multi-processor system, said multi-processor system two or more processor nodes, each processor node having a processor, local memory and a communications bus interface, also having a plurality of point-to-point communication busses disposed between pairs of said communications bus interfaces such that data may be moved across said point-to-point busses between said local memories of said processor nodes, and further having one or more I/O busses disposed to communicate with all said processor nodes as well with sources and destinations outside said arrangement, said autonomous configurable signal processing resource comprising:

one or more configurable signal processing frameworks selectably disposed in series with one or more communication bus or I/O bus such that data traversing a bus may be processed by logic hosted by said processing frameworks, and a direct memory access ("DMA") interface to one or more of the other processing nodes for receiving data, and an internal bus selector for storing data and computational results in a local memory;

a bi-directional bus selector associated with said local memory for selectively inputting and outputting data; and a DMA controller disposed as to communicate with said local memory bus selector and said signal processing framework internal bus selector such that said signal processing framework may autonomously receive and transmit data selectively to and from said local memory, said DMA controller providing retrieval of data from said local memory and presentation of said retrieved data to said signal processing resource input DMA interface.

2. The autonomous configurable signal processing resource as set forth in claim 1 wherein said DMA controller is further adapted to communicate data bidirectionally with local memories of one or more additional processing nodes.

3. The autonomous configurable signal processing resource as set forth in claim 1 wherein said DMA controller is further adapted to communicate data bidirectionally with one or more peripheral component interconnect ("PCI") bus interfaces.

4. The autonomous configurable signal processing resource as set forth in claim 1 wherein said local memory comprises at least two memory resources organized as ping-pong buffers.

5. The autonomous configurable signal processing resource as set forth in claim 4 wherein said ping-pong buffers are adapted for use as one write-only memory resource and one read-only resource, said write-only and read-only modes being switchable.

* * * * *